US008817319B2

(12) United States Patent
Martin (10) Patent No.: US 8,817,319 B2
(45) Date of Patent: Aug. 26, 2014

(54) SYSTEM AND METHOD FOR DIRECT RENDERING OF A DOCUMENT TO AN ELECTRONIC BOOK DEVICE IN DEVICE-SUPPORTED FORMAT

(75) Inventor: Craig W. Martin, Henrietta, NY (US)

(73) Assignee: Xerox Corporation, Norwalk, CT (US)

(*) Notice: Subject to any disclaimer, the term of this patent is extended or adjusted under 35 U.S.C. 154(b) by 726 days.

(21) Appl. No.: 12/695,421

(22) Filed: Jan. 28, 2010

(65) Prior Publication Data

US 2011/0181894 A1 Jul. 28, 2011

(51) Int. Cl.
*G06K 15/02* (2006.01)
*H04N 1/00* (2006.01)
*G06F 3/12* (2006.01)

(52) U.S. Cl.
CPC ...... *G06F 3/1284* (2013.01); *H04N 2201/0068* (2013.01); *H04N 2201/0094* (2013.01); *H04N 1/00204* (2013.01); *G06F 3/1204* (2013.01); *G06F 3/1209* (2013.01); *G06F 3/1275* (2013.01); *G06F 2206/1512* (2013.01); *G06F 3/1244* (2013.01)
USPC .............................. 358/1.2; 358/1.15; 710/62

(58) Field of Classification Search
USPC .................. 358/1.2, 1.13, 1.15, 400; 340/5.2; 345/173, 530; 370/401; 386/239; 434/317; 705/51, 59; 710/62; 715/243, 715/276, 776
See application file for complete search history.

(56) References Cited

U.S. PATENT DOCUMENTS

| | | | | |
|---|---|---|---|---|
| 5,956,034 A * | 9/1999 | Sachs et al. | | 715/776 |
| 5,956,048 A * | 9/1999 | Gaston | | 345/530 |
| 7,072,055 B1 * | 7/2006 | Carter et al. | | 358/1.15 |
| 2005/0060490 A1 * | 3/2005 | Lu | | 711/115 |
| 2005/0081137 A1 * | 4/2005 | Ferlitsch | | 715/500 |
| 2005/0190394 A1 * | 9/2005 | Ohue | | 358/1.13 |
| 2006/0116967 A1 * | 6/2006 | Koike et al. | | 705/59 |
| 2007/0026371 A1 * | 2/2007 | Wood | | 434/317 |
| 2007/0080776 A1 * | 4/2007 | Suwabe et al. | | 340/5.2 |
| 2008/0046829 A1 * | 2/2008 | Leong | | 715/764 |
| 2008/0278743 A1 * | 11/2008 | Hardy et al. | | 358/1.15 |
| 2009/0282193 A1 * | 11/2009 | Corona | | 711/115 |

FOREIGN PATENT DOCUMENTS

JP 2006065204 A * 3/2006

OTHER PUBLICATIONS

Machine translation of JP 2006065204 A as relied upon by the examiner.*
Associated Press, "5 top publishers plan rival to Kindle format", Technology Review, MIT, www.technologyreview.com (Dec. 2009).

(Continued)

*Primary Examiner* — David S Cammack
(74) *Attorney, Agent, or Firm* — MH2 Technology Law Group LLP (57) ABSTRACT

A multifunction device includes a controller that is configured to process data from a processor capable of executing a printing utility. The controller renders the data into a format readable by an electronic book device having a processor.

A document print management system includes the multifunction device, and a port configured to transfer the data to an electronic book device when an electronic book device is in operative communication with the controller via the port. The system also includes an electronic book device in operative communication with the controller via the port. In a method for rendering a document to an electronic book device, the method includes causing a document management device to process data received from a processor capable of executing a printing utility and rendering image data into a format readable by the electronic book device.

18 Claims, 4 Drawing Sheets

(56) References Cited

OTHER PUBLICATIONS

Eisenberg, "Devices to Take Textbooks Beyond Text", novelties@nytimes.com, (Dec. 2009).

Fowler, "E-Readers: They're Hot Now, But the Story Isn't Over", The Wall Street Journal, www.online.wsj.com (Dec. 2009).

Xerox Customer Service, "Printing to a Xerox Multi-function Device Using Port 9100", Customer Tips, Xerox Multifunction Devices (Sep. 2003).

* cited by examiner

SYSTEM AND METHOD FOR DIRECT RENDERING OF A DOCUMENT TO AN ELECTRONIC BOOK DEVICE IN DEVICE-SUPPORTED FORMAT

BACKGROUND

1. Technical Field

The present disclosure relates to systems and methods for transferring and displaying digitized images to an electronic book device.

2. Discussion of Related Art

Digital multimedia presentation appliances, such as digital picture frames, digital televisions, computer monitor displays, and electronic books, enable users to display digitized images which are obtained from sources, such as the world wide web, a paid service, a memory card, or a computing device (such as a digital camera), connected to the digital multimedia presentation appliance wirelessly or non-wirelessly, e.g., via a universal serial bus (USB) connection, and other means.

With respect to electronic books (e-books), there are few options available to readers who want to convert documents that are in a non-supported format to a format that is readable by the particular e-book. The conversion process to a readable format is generally performed by running a utility on a personal computer that performs the conversion. There is neither a print routine or function nor a scan routine or function in such a conversion process. In some e-book systems, the user is advised to email the file to a personal email address that is to an email system that is dedicated to that particular e-book. The document is then converted to a format readable by the particular e-book. Oftentimes, there is a charge associated with the conversion of the format to a readable format.

While it is possible for users themselves to convert non-supported formats into the format(s) readable by the particular e-book, such methods are often cumbersome for the user.

In the processing of data to electronic book devices, there is no rendering of data via a printing utility such as a printing utility executable from a print controller.

Existing multifunction devices (MFDs) which include print controllers to execute a printing utility do not recognize an electronic book device as a media type, e.g., the controllers do not recognize an electronic book device to render data to as they recognize outputting to paper or to a scan folder.

SUMMARY

The embodiments of the present disclosure advance the state of the art of rendering data to an electronic book device.

The present disclosure advances the state of the art by providing a print controller which recognizes an electronic book device as another type of print media such as paper.

The present disclosure also advances the state of the art by providing a print controller which enables rendering of scan data from the user interface of a scanner of an MFD to an electronic book device.

The present disclosure advances the state of the art by printing directly to an electronic book device by embedding printer job language.

More particularly, the present disclosure relates, in one embodiment, to a multifunction device that includes a scanning engine configured to scan documents, a printing engine, and a controller controlling the scanning and printing engines. The controller is configured to process data to the printing engine. The data is received from a processor capable of executing a printing utility associated with the printing engine. The controller is further configured to render the data into a format readable by an electronic book device.

The present disclosure relates also to, in one embodiment, a document print management system that includes a multifunction device. The multifunction device includes a scanning engine configured to scan documents, a printing engine, and a controller controlling the scanning and printing engines and configured to process data from a processor capable of executing to the printing engine a printing utility associated with the printing engine and the controller rendering the data into a format readable by an electronic book device and a port configured to transfer the data to the electronic book device when the electronic book device is in operative communication with the controller via the port. The system also includes an electronic book device in operative communication with the controller via the port.

The present disclosure relates also to, in a system that includes a multifunction device in operative communication with an electronic book device and a processor capable of executing a printing utility and in operative communication with the multifunction device, a method for rendering a document to an electronic book device. The method includes processing, via the multifunction device data received from the processor capable of executing the printing utility and rendering image data into a format readable by the electronic book device.

BRIEF DESCRIPTION OF THE DRAWINGS

These and other advantages will become more apparent from the following detailed description of the various embodiments of the present disclosure with reference to the drawings wherein.

DETAILED DESCRIPTION

The present application relates to commonly-owned U.S. Patent Application Publication No. US 2008/0278743 A1, "SYSTEM AND METHOD FOR PRINTING AT LEAST ONE DIGITIZED IMAGE TO A DIGITAL MULTIMEDIA PRESENTATION APPLIANCE", by Hardy et al., the entire contents of which are hereby incorporated by reference.

An electronic book device as defined herein includes, but is not limited to, electronic readers (e-reading devices) as well as personal computers, netbooks, notebooks, tablet computers, cellular radio telecommunications devices, smart phones, portable electronic readers and personal digital assistant devices and suitable like devices. The foregoing devices may render color images in addition to black and white images. In addition, as defined herein, an electronic book device includes devices having more than one screen in which one of the screens may display in color in addition to black and white. An electronic book device as defined herein includes devices which are hybrids or combinations of the aforementioned devices.

According to one embodiment of the present disclosure, a print job stream client work station renders documents of choice to a print controller of a document print management device, which may be included within a multifunction device, either in image format or in the native format of the particular destination electronic book device to which the data are being rendered.

When the data are image data, the print controller converts the one or more documents to a series of images. The electronic book device may support various image formats such as JPEG, PNG and GIF. When required, the controller names the image files in ascending alphabetical or numerical order to enable the print controller to establish a table of contents within the processor of the electronic book device and capable of being displayed on the display of the electronic book device.

If not already present within the processor of the electronic book device, the print controller creates an image or picture folder or directory within the processor of the electronic book device and a sub-directory named to be associated with the particular print job. The print controller then places the rendered images in the sub-directory. If necessary, the print controller may convert the scale of the images to conform to the resolution required by the electronic book device.

The electronic book device may then be decoupled from the print controller and, as is known in the art, appropriate keys on the keyboard of the electronic book device may then be depressed by the user to display individual document titles as a list on the electronic book device display. The user may then click on a desired title to view a particular page and also scroll through the images as desired.

In another embodiment according to the present disclosure, each individual document page is scanned at a scanner user interface of a multifunction device. The scanner scans each individual document page and assigns each page a name in ascending order. The print controller stores each scanned image in an image folder in the processor of the electronic book display. Upon completing the scan of the last document page, the user instructs the print controller that the book is complete. Again, if necessary, the print controller may convert the scale of the images to conform to the resolution required by the electronic book device.

The print controller informs the electronic book device of the location of the image folder. The electronic book device may then be decoupled from the print controller and actuated by the user in the same manner as described above.

The document print management system in either embodiment may be configured to render the same data to multiple electronic book devices within a specific time period.

Figure 1:
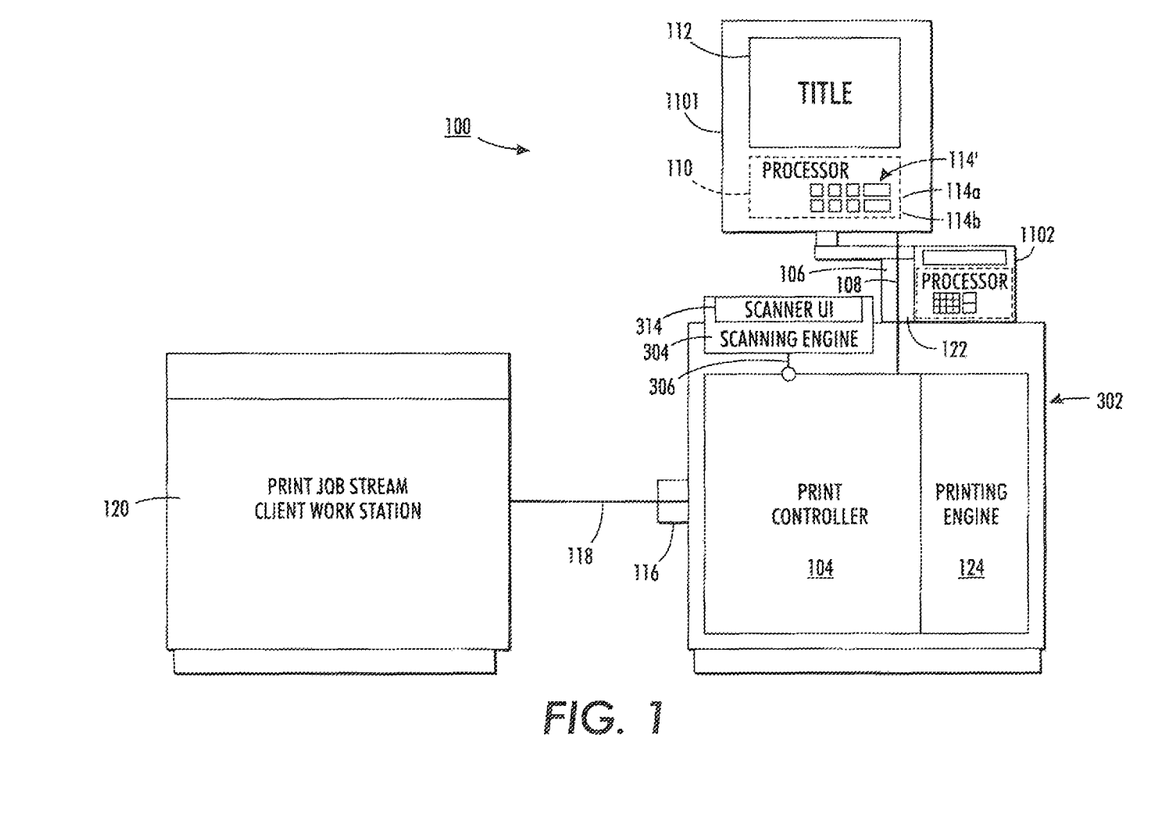
FIG. 1 is a schematic block diagram of a document management system that is configured to render a print job stream into a series of images readable at an electronic book according to one embodiment of the present disclosure.

Turning now to FIG. 1, there is illustrated a document print management system 100 that includes a multifunction device (MFD) 302 having a printing engine 124, and a scanning engine 304 that includes a scanner user interface (UI) 314. The multifunction device 302 includes a print controller 104 that is configured to process data to the printing engine 124 from another processor capable of executing a printing utility to the printing engine 124. The print controller 104 is further configured to render the data into a format readable by an electronic book device (as described below). The scanner user interface (UI) 314 communicates with the print controller 104 via the scanning engine 304. The scanning engine 304 is in operative communication with the print controller 104, such as by a hard-wired connection 306 to the print controller 104. The scanner UI 314 is configured to scan documents. The print controller 104 interprets images output by the scanner UI 314 to the scanning engine 304 after the scanning of one or more documents. As defined herein, a document is a paper or other material capable of having thereon text or one or more illustrations of images or the like, any of which are in a form that may be scanned by the scanner UI 304 and any of which may either be manually produced or machine produced.

More particularly, the multifunction device 302 includes a port 106 that is configured to receive at least one electronic book device 1101. The port 106 is configured to transfer the data to the electronic book device 1101 when the electronic book device 1101 is in operative communication with the print controller 104 via the port 106. As illustrated, the electronic book device 1101 is in operative communication with the print controller 104 via the port 106 through a hard-wired connection 108. However, those skilled in the art will recognize that the electronic book device 1101 may be in operative communication with the print controller 104 via a wireless connection.

More particularly, the print controller 104 is therefore in operative communication with processor 110 of the electronic book device 1101. The electronic book device 1101 includes a screen or display 112 and a keyboard having a plurality of keys 114' including scroll feature keys such as "NEXT" key 114a and "PREVIOUS" key 114b. The screen or display 112 and the keyboard and plurality of keys 114' are in operative communication with the processor 110.

The print controller 104 is configured with a raw socket 116. As defined herein, raw socket 116 supports a form of raw printing commonly referred to as any of the following: raw sockets, port printing, standard TCP/IP, Port 9100, Port 2500, AppSocket, and IP direct. All of these identifiers represent the same printing process:

Open a TCP socket-level connection on the specified port;
"Dump the code" or send a print ready file to the port; and
Close the connection.

As defined and as used in the present disclosure herein, a raw socket refers to the form of raw printing referred to by the foregoing identifiers. (Source: Xerox Multifunction Devices—Customer Tips—"Printing to a Xerox Multi-function Device Using Port 9100" Dc00 cc0104-Sep. 26, 2003, page 1).

Print controller 104 is configured to process data from print job stream client work station 120. That is, the print controller 104 is configured to receive a print job stream when the print job stream client work station 120 is in operative communication with the controller 104. The data may be rendered from the print job stream client work station 120 to the print controller 104 through raw socket 116 via a hard-wired connection 118 as shown. Alternatively, those skilled in the art will recognize that the data may be rendered from the print job stream client work station 120 to the print controller 104 through raw socket 116 via a wireless connection. The embodiments of the document print management system 100 are not limited in this context.

The print job stream client work station 120 is configured to enable a user to embed a print job language identifier, e.g., "@PJL EBOOK FORMAT=IMAGE" or "@PJL EBOOK FORMAT=NATIVE", that directs a print job stream processed by the print job stream client work station 120 to the electronic book device 1101. The print job stream client work station is configured so as, upon a user embedding a print job language identifier, to enable the user to send the print job stream to the print controller 104. Thus, the print controller 104 is configured to process data received from a processor, such as, or including, the print job stream client work station 120, that is capable of executing a printing utility associated with the printing engine 124.

The print controller 104 is configured to convert at least one document in the print job stream from at least one document in image format and/or at least one document in native format. The print controller 104 is configured to convert the at least one document to at least one image and name the at least one image when the print controller 104 converts at least one document in the print job stream from at least one document in image format. For example, the print controller 104 may name each image "0001.jpg," "0002.jpg," and so on. The print controller 104 may be configured such that, if necessary, the print controller 104 converts the scale of one or more images into a resolution readable by the electronic book device 1101. For example, the resolution readable by the electronic book device 1101 may be 600×800 pixels which is the resolution of the display 112. The print controller 104 therefore resizes the image format to conform to the 600×800 pixel resolution of the display 112.

The print controller 104 is configured to create at least one image folder in the processor of the electronic book device 1101. The print controller 104 is configured to store the at least one image in the at least one image folder.

Once the print controller 104 has stored at least one image in the image folder, the user may decouple the electronic book device 1101 from the multifunction device 302 at the port 106 so as to read the electronic book device 1101, if desired, independently of the multifunction device 302. The electronic book device 1101 enables a user to depress a key, or combination of keys, on the keyboard 114, e.g., the user depresses "Alt-Z" or an equivalent function combination of keys, causing individual document titles corresponding to individual images to appear in a list on the electronic book display 112. The user may click on one of the individual document titles to view on the display 112 the individual image corresponding to the individual document title, e.g., "TITLE" or "0001.jpg," or "0001.jpg," etc. The user may scroll through the individual document titles in view on the display 112 by operating the scroll feature keys such as "NEXT" key 114*a* and "PREVIOUS" key 114*b*.

In one embodiment of the present disclosure, a universal serial bus (USB) hub 122 is in operative communication with the port 106. The USB hub 122 is configured to receive a plurality of electronic book devices, e.g., devices 1101, 1102 . . . up to the capacity of the hub. At the current time, such hubs are available to accommodate up to 50 separate connecting devices. The hub 122 is in operative communication with the print controller 104 via the port 106. In this operational mode, the print controller 104 is configured to enable rendering of the data substantially simultaneously or sequentially to at least two of the plurality of electronic book devices, e.g., electronic book devices 1101 and 1102, in receipt by the USB hub 122. The rendering of the data substantially simultaneously or sequentially is defined herein as rendering of the data to a plurality of electronic book devices such that differences in the time of completion of the rendering of the data from one electronic book device to another electronic book device are imperceptible to a user, e.g., "in real time".

Figure 2:
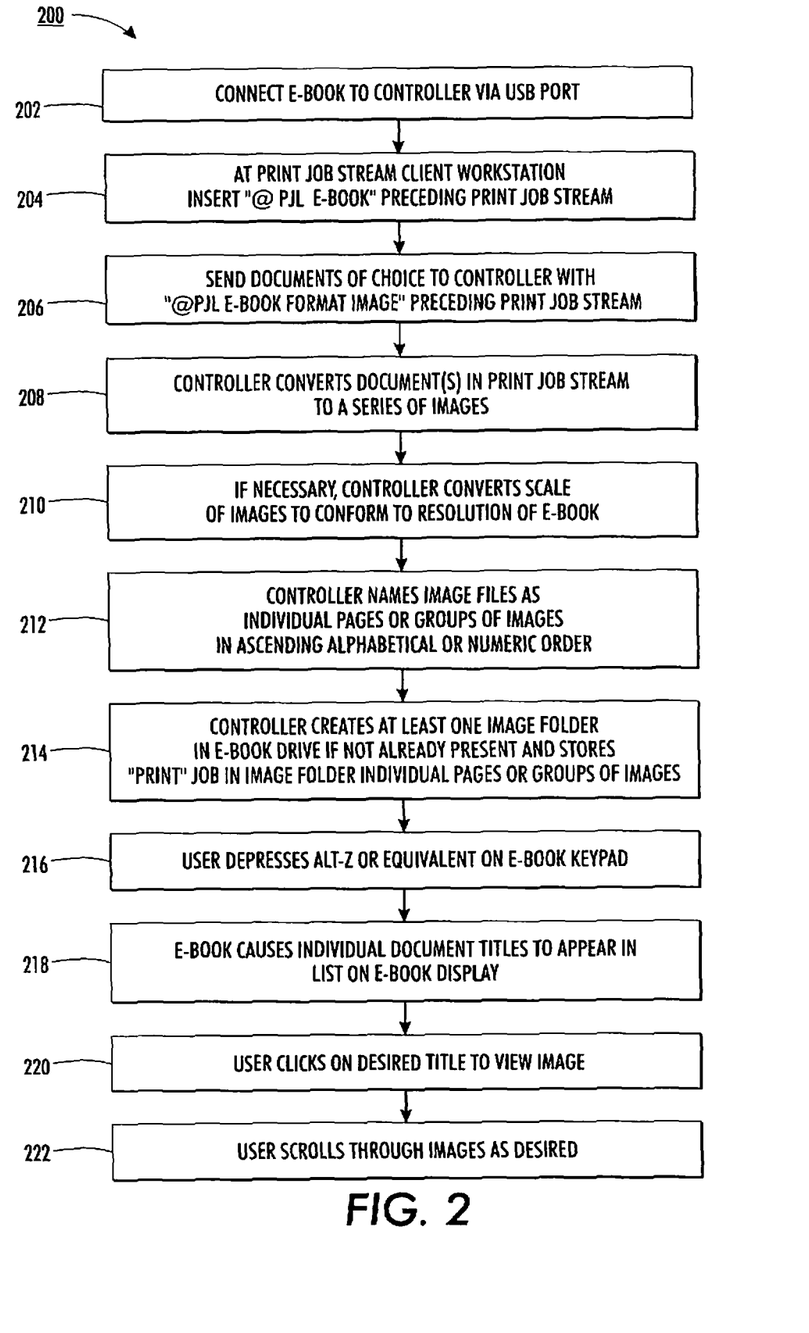
FIG. 2 is a method flow chart for rendering a print job stream into a series of images readable at an electronic book according to one embodiment of the present disclosure.

FIG. 2 illustrates a method flow chart for rendering a print job stream into a series of images readable at an electronic book, such as by a user operating the document print management system illustrated in FIG. 1 and described above. More particularly, method 200 for rendering a print job stream into a series of images readable at an electronic book includes step 202 of a user connecting at least one electronic book device ("E-BOOK") 1101 to the print controller 104 via the USB port 106 to establish operative communication between the at least one electronic book device 1101 and the print controller 104, and more particularly between the processor 110 of the electronic book device 1101 and the print controller 104. Step 204 includes, at the print job client work station 120, the user inserting print job routing identifier "@PJL EBOOK FORMAT=IMAGE" when the data are to be converted to image data. Alternatively, step 204 may also be implemented by the user inserting "@PJL EBOOK FORMAT=NATIVE" when the data are to be converted to the native format of the electronic book device 1101.

In step 206, the user sends documents of choice to the print controller 104 with the print job routing identifier "@PJL EBOOK FORMAT=IMAGE" preceding the print job stream. In step 208, the print controller 104 converts one or more documents in the print job stream into a series of images. In step 210, if necessary, the print controller 104 converts the scale of the images to conform to the resolution of the electronic book device 1101. For example, the print controller 104 may convert the scale of the images to 600×800 pixels to conform to the resolution of the electronic book device 1101.

In step 212, the print controller 104 names the image files as individual pages or groups of images in ascending alphabetical or numerical order, e.g., "0001.jpg," "0002.jpg," etc. In step 214, the print controller 104 creates at least one "picture" folder in the electronic book drive (processor 110), if not already present, and stores the "print" job, i.e., individual pages of images or groups of images, in the "picture" folder.

At this point, if desired, the user may decouple the electronic book device 1101 from the USB port 106. In step 216, the user may then depress the "Alt-Z" or equivalent keyboard function on the keyboard 114 key pad. In step 218, the electronic book device processor 110 causes individual titles to appear in a list on the display 112. In step 220, the user clicks on the desired title to view the particular image. In step 222, the user scrolls through the images as desired.

It can be appreciated therefore that the system 100 in FIG. 1 includes the multifunction device 302 that is in operative communication with the electronic book device 1101 and a processor capable of executing a printing utility, e.g., the print job client work station 120, and which is in operative communication with the multifunction device 302. The method may include processing, via the multifunction device 302, data received from the processor capable of executing a printing utility, e.g., the print job client work station 120, and rendering image data into a format readable by the electronic book device 1101.

Figure 3:
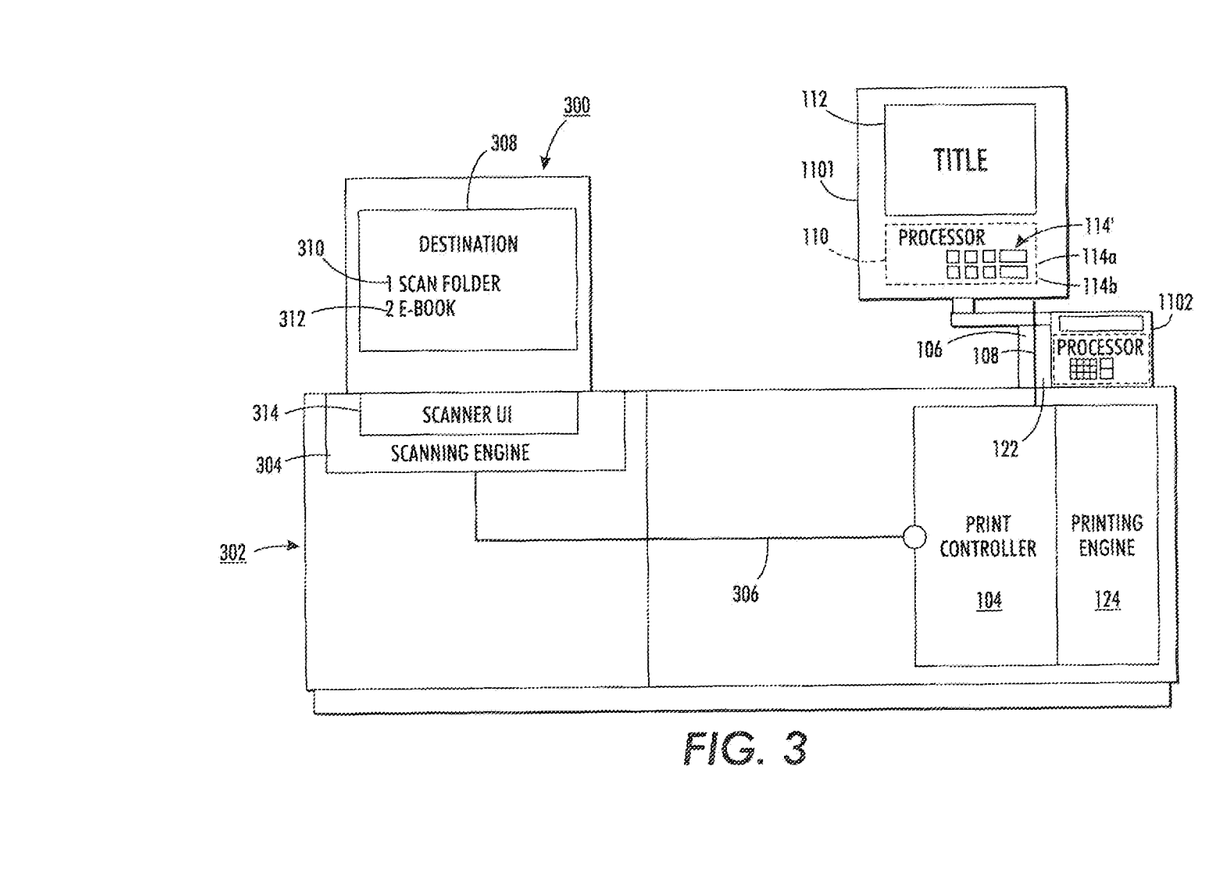
FIG. 3 is a schematic block diagram of a document management system that is configured to render a paper document to a series of images readable at an electronic book according to one embodiment of the present disclosure.

FIG. 3 illustrates an alternate embodiment of the present disclosure. More particularly, FIG. 3 is a schematic block diagram of a document print management system 300 that is configured to render a paper document to a series of images readable by an electronic book device. Since the multifunction device 302 and the associated print controller 104 and USB port 106 and hub 122 and the electronic book devices(s) 1101, 1102 . . . and associated components are identical to those illustrated in FIG. 1, the discussion herein will be generally limited to the components of system 300 which differ from those described with respect to FIG. 1.

In FIG. 3, the associated USB port 106 is included within multifunction device 302. The multifunction device 302 includes scanning engine 304, which again includes scanner user interface 314. The scanning engine 304 is operatively coupled to the print controller 104 via hard-wired connection 306 that is illustrated schematically for simplicity of the discussion herein as a single wire connection. Those skilled in the art will recognize that a wireless connection may be substituted for the hard-wired connection 306. Via the scanning engine 304, the scanner UI 314 is in operative communication with a screen or display 308 that is configured so as to, in addition to enabling a user to identify a scan folder as the destination 310 for the scan document job, also enable a user to identify an electronic book device, e.g., one or more electronic book devices 1101, 1102 . . . , as the destination 312 for the scan document job.

In system 300, the data are image data, and the multifunction device 302 is configured to scan at the user interface 314 individual pages of the image data and to assign each individual page a name in ascending order in a similar manner as described above with respect to system 100, e.g., in ascending alphabetical or numerical order, e.g., "0001.jpg," "0002.jpg," etc. The scanner UI 314 is configured to send (or render) each scanned imaged from the scanner user interface 314 to the scanning engine 304 directly to the print controller 104 via the connection 306. The print controller 104 controls the scanning engine 304 such that the scanner UI 314 interfaces with the print controller 104 to execute to the printing engine 124 a printing utility associated with the printing engine 124 to the print controller 104. The print controller 104 is configured to store each individual page of the scanned image data in an image data folder residing in the processor 110 of the one or more electronic book devices 1101, 1102 . . . . Thus, the scanning engine 304 is an example of a processor capable of executing a printing utility. The print controller 104 interprets the scanned images.

The system 300 is further configured such that, upon completing the scan of the last document page, the user instructs the print controller 104, via the scanner user interface 314, that the "book" is complete. If necessary, in a similar manner as with respect to system 100, the print controller 104 converts the scale of the images to conform to the resolution of the one or more electronic book devices 1101, 1102 . . . . Since the user has identified the destination 312 for the scanned images, and thus the "book", as being the one or more electronic book devices 1101, 1102 . . . etc., the controller automatically directs the scanned images to the processor 110 of the electronic book device or devices 1101, 1102, etc. The system 300 is also configured such that the print controller 104 informs the processor 110 of the one or more electronic book devices 1101, 1102 . . . of the location of the "book" image data folder on the drive of the processor 110.

Upon completion of the rendering of the scanned image data to the one or more electronic book devices 1101, 1102 . . . , the user may again, if desired, decouple the one or more electronic book devices 1101, 1102 from the document print management device 102 at the port 106 so as to read the electronic book device 1101, if desired, independently of the document print management device 102. Again, the electronic book device 1101 (or 1102 . . . ) enables a user to depress a key, or combination of keys, on the keyboard 114, e.g., the user depresses "Alt-Z" or an equivalent function combination of keys, causing individual document titles corresponding to individual images to appear in a list on the electronic book display 112. The user may click on one of the individual document titles to view on the display 112 the individual image corresponding to the individual document title, e.g., "TITLE" OR "0001.jpg," or "0001.jpg," etc. The user may scroll through the individual document titles in view on the display 112 by operating the scroll feature keys such as "NEXT" key 114a and "PREVIOUS" key 114b.

Figure 4:
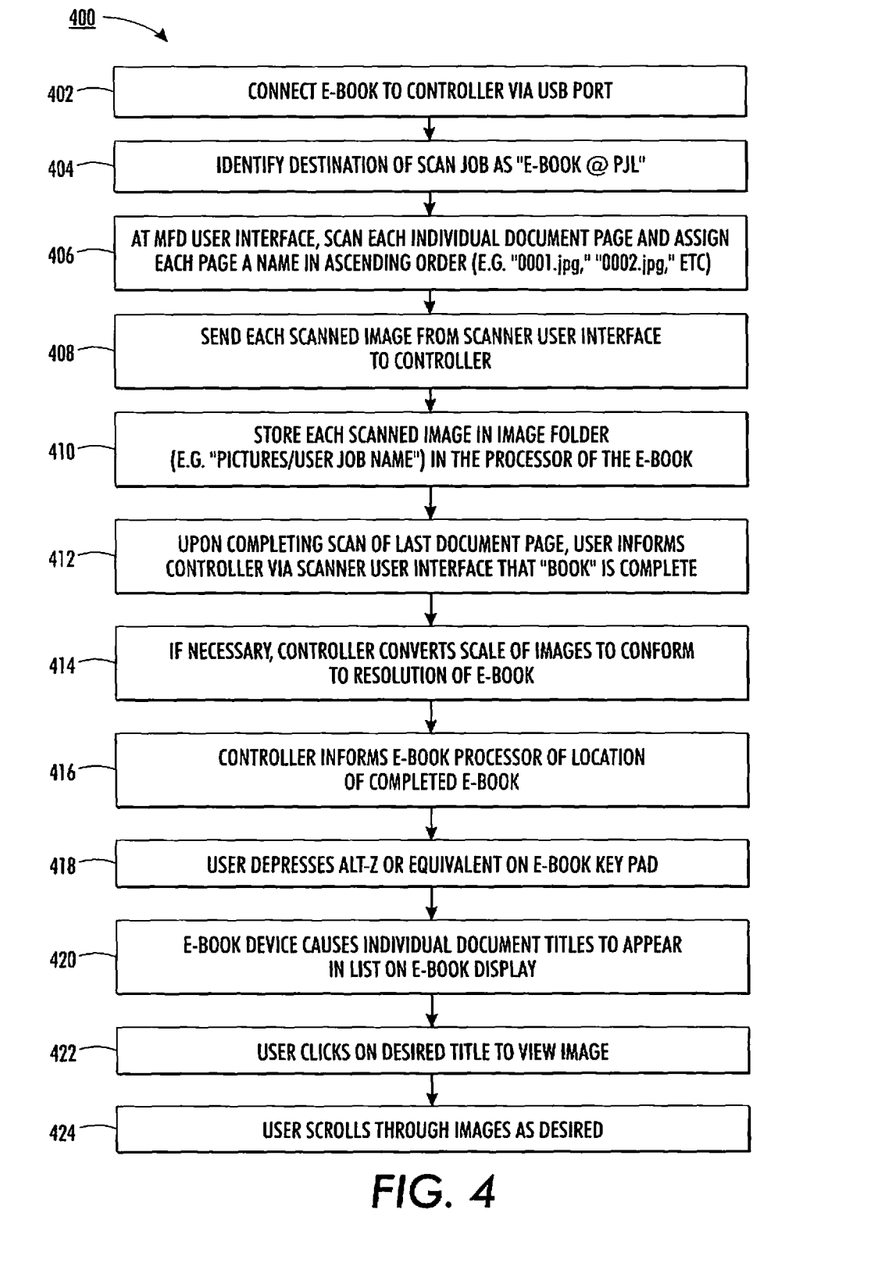
FIG. 4 is a method flow chart for rendering a paper document to a series of images readable at an electronic book according to one embodiment of the present disclosure.

FIG. 4 illustrates a method flow chart for rendering a paper document to a series of images readable at an electronic book according to one embodiment of the present disclosure, such as by a user operating the document print management system illustrated in FIG. 3 and described above. More particularly, method 400 for rendering a paper document to a series of images readable at an electronic book includes step 402 of a user connecting at least one electronic book device ("E-BOOK") 1101 to the print controller 102 via the USB port 106 to establish operative communication between the at least one electronic book device 1101 and the print controller 102, and more particularly between the processor 110 of the electronic book device 1101 and the print controller 104. Step 404 includes, at the scanner user interface 314, the user specifying the print job routing identifier "@PJL EBOOK FORMAT=IMAGE" when the data are to be converted to image data and specifying the destination as the electronic book device 1101. Alternatively, step 404 may also be implemented by the user inserting "@PJL EBOOK FORMAT=NATIVE" when the data are to be converted to the native format of the electronic book device 1101 and specifying the destination as the electronic book device 1101.

In step 406, at the scanner user interface 314, step 406 includes scanning each individual document page and assigning each page a name in ascending alphabetical or numerical order, e.g., "0001.jpg," "0002.jpg," etc. Step 408 includes sending each scanned image from the scanner user interface 314 to the print controller 104.

Step 410 includes storing each scanned image in an image folder (e.g., "PICTURES/USER JOB NAME") in the print controller 104. In step 412, upon completing the scan of the last document image, at the scanner user interface 304, the user informs the print controller 104 that the "book" is complete. Since the user has identified the destination 312 for the scanned images, and thus the "book", as being the one or more electronic book devices 1101, 1102 . . . etc., the print controller 104 automatically directs the scanned images to the processor 110 of the electronic book device or devices 1101, 1102, etc. In step 414, if necessary, the print controller 104 converts the scale of the images to conform to the resolution of the electronic book device 1101. For example, the print controller 104 may convert the scale of the images to 600×800 pixels to conform to the resolution of the electronic book device 1101. In step 416, the print controller 104 informs the electronic book processor 110 of the location of the completed book.

At this point, in a similar manner as described above with respect to method 200, if desired, the user may decouple the electronic book device 1101 from the USB port 106. In step 418, the user may then depress the "Alt-Z" or equivalent keyboard function on the keyboard 114 key pad. In step 420, the electronic book device processor 110 causes individual titles to appear in a list on the display 112. In step 422, the user clicks on the desired title to view the particular image. In step 424, the user scrolls through the images as desired.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A multifunction device comprising:
a scanning engine configured to scan documents;
a printing engine;
a controller controlling the scanning and printing engines,
wherein the controller is configured to process data to the printing engine, wherein the data are image data, wherein the data is received from a processor capable of executing a printing utility associated with the printing engine, wherein the processor capable of executing the printing utility includes a print job stream client work station, wherein the print job stream client work station is configured to enable a user to embed a print job language identifier that directs a print job stream processed by the print job client work station to an electronic book device, wherein the scanning engine includes a scanner user interface, the scanning engine and scanner user interface interfacing with the controller to execute to the controller a printing utility associated with the scanning engine, wherein the controller is further configured to render the data into a format readable by an electronic book device, wherein the controller is configured to convert the scale of at least one image included within the image data into a resolution readable by the electronic book device, wherein the controller comprises a print controller that is hard-wired to the scanning engine;

a port configured to transfer the data to a processor of the electronic book device when the electronic book device is in operative communication with the controller via the port; and a universal serial bus (USB) hub in operative communication with the port wherein the USB hub is configured to receive a plurality of electronic book devices in operative communication with the controller via the port and wherein the controller is configured to enable rendering of the data to at least two of the plurality of electronic book devices.

2. The multifunction device according to claim 1, wherein the print job client work station is configured, upon a user embedding a print job language identifier that directs a print job stream processed by the print job client work station to an electronic book device, to enable a user to send the print job stream to the controller.

3. The multifunction device according to claim 2, wherein the controller is configured to convert at least one document in the print job stream from one of a (a) at least one document in image format and (b) at least one document in native format.

4. The multifunction device according to claim 3, wherein the controller is configured to convert at least one document in the print job stream from at least one document in image format, and wherein the controller is configured to convert the at least one document to at least one image and name the at least one image.

5. The multifunction device according to claim 4, wherein the controller is configured to create at least one folder in the processor of the electronic book device and wherein the controller is configured to store the at least one image in the at least one folder.

6. The multifunction device according to claim 1,
wherein the multifunction device is configured to scan at the user interface individual pages of the image data and to assign each individual page a name in ascending order.

7. The multifunction device according to claim 6, wherein the controller is configured to store each individual page of the scanned image data in an image data folder residing in the processor of the electronic book device.

8. The multifunction device according to claim 1, wherein the port is configured to transfer data to the processor of the electronic book device via a wireless connection.

9. A document print management system comprising:
a multifunction device comprising:
a scanning engine configured to scan documents, wherein the scanning engine has a scanner user interface;

a printing engine; and a controller controlling the scanning and printing engines and configured to process data from a processor capable of executing to the printing engine a printing utility associated with the printing engine and with the scanning engine, wherein the data comprises image data, the controller rendering the data into a format readable by an electronic book device, the scanning engine and scanner user interface interfacing with the controller to execute to the controller the printing utility, wherein the processor capable of executing the printing utility associated with the printing engine includes a print job stream client work station, wherein the print job stream client work station is configured to enable a user to embed a print job language identifier that directs a print job stream processed by the print job client work station to the electronic book device, wherein the controller comprises a print controller that is hard-wired to the scanning engine;

a port configured to transfer the data to the electronic book device when the electronic book device is in operative communication with the controller via the pot and a universal serial bus (USB) hub in operative communication with the port wherein the USB hub is configured to receive a plurality of electronic book devices in operative communication with the controller via the port, wherein the controller is configured to enable rendering of the data to at least two of the plurality of electronic book devices;

wherein the controller is configured to convert the scale of at least one image included within the image data into a resolution readable by an electronic book device.

10. The document print management system according to claim 9, wherein the print job client work station is configured, upon a user embedding a print job language identifier that directs a print job stream processed by the print job client work station to an electronic book device, to enable a user to send the print job stream to the controller.

11. The document print management system according to claim 10, wherein the controller is configured to convert at least one document in the print job stream from one of a (a) at least one document in image format and (b) at least one document in native format.

12. The document print management system according to claim 11, wherein the controller is configured to convert at least one document in the print job stream from at least one document in image format, and wherein the controller is configured to convert the at least one document to at least one image and name the at least one image.

13. The document print management system according to claim 12, wherein the controller is configured to convert the scale of the at least one image into a resolution readable by the electronic book device.

14. The document print management system according to claim 13, wherein the controller is configured to create at least one folder in the processor of the electronic book device and wherein the controller is configured to store the at least one image in the at least one folder.

15. The document print management system according to claim 9,
wherein the data are image data, and
wherein the multifunction device is configured to scan at the user interface individual pages of the image data and to assign each individual page a name in ascending order.

16. The document print management system according to claim 15, wherein the controller is configured to store each individual page of the scanned image data in an image data folder residing in the processor of the electronic book device.

17. The document print management system according to claim 9, wherein the port is configured to transfer data to the processor of the electronic book device via a wireless connection.

18. A method for rendering a document to an electronic book device,
in a system comprising:
  a multifunction device in operative communication with the electronic book device, the multifunction device including a scanning engine, the scanning engine including a scanner user interface, and a universal serial bus (USB) hub in operative communication with a port, wherein the USB hub is configured to receive a plurality of electronic book devices in operative communication with a controller via the port; and
  a processor capable of executing a printing utility and in operative communication with the multifunction device, wherein the scanning engine and scanner user interface are configured to interface with the controller to execute to the controller a printing utility associated with the scanning engine, wherein the controller comprises a print controller that is hard-wired to the scanning engine, wherein the processor capable of executing the printing utility includes a print job stream client work station, wherein the print job stream client work station is configured to enable a user to embed a print job language identifier that directs a print job stream processed by the print job client work station to the electronic book device,
the method comprising:
processing, via the multifunction device, data received from the processor capable of executing the printing utility, wherein the data are image data;
converting the scale of at least one image included within the image data into a resolution readable by the electronic book device;
rendering image data into a format readable by the electronic book device;
rendering, via the multifunction device, the data to at least two of the plurality of electronic book devices.

\* \* \* \* \*